United States Patent [19]

Lynch

[11] 4,279,850
[45] Jul. 21, 1981

[54] DRILL PIPE TOOL JOINT PROTECTOR

[76] Inventor: Paul E. Lynch, 721 Milky Way, Garland, Tex. 75040

[21] Appl. No.: 39,127

[22] Filed: May 15, 1979

[51] Int. Cl.³ .............................................. B29D 3/00
[52] U.S. Cl. .................................. 264/135; 264/259; 264/265; 264/278
[58] Field of Search ................ 264/135, 265, 278, 259

[56] References Cited

U.S. PATENT DOCUMENTS

| | | | |
|---|---|---|---|
| 1,814,183 | 7/1931 | Patterson | 285/45 |
| 2,284,335 | 5/1942 | Meyer | 260/36 |
| 2,604,660 | 7/1952 | Karns | 264/278 |
| 2,857,931 | 10/1958 | Lawton | 264/135 |
| 3,776,996 | 12/1973 | Cameron et al. | 264/278 |
| 3,942,824 | 3/1976 | Sable | 285/45 |
| 3,950,468 | 4/1976 | Rainville | 264/538 |
| 3,997,639 | 12/1976 | Rochelle | 264/265 |

Primary Examiner—James H. Derrington
Attorney, Agent, or Firm—Head & Johnson

[57] ABSTRACT

A method of applying a protective shield to a drill pipe tool joint including positioning a centering hub on the end of the tool joint, positioning a bifurcated mold around the tool joint, the mold having a rearward end engaging the drill pipe and a forward end engaging the hub thereby centering the mold on the tool joint, the internal diameter of the mold being greater than the external diameter of the tool joint providing an annular cavity defining the preselected shape of the protective shield, injecting liquid plastic material through an opening in the mold to fill the annular cavity, allowing the material to solidify, and removing the mold hub.

The invention also provides an apparatus for applying a protective shield to the tool joint of a drill pipe, including a hub with means for engaging the end of a drill pipe, the hub having a circular portion defining a positioning surface concentric with the drill pipe and a sectioned mold positionable around a tool joint, the rearward end of the mold engaging the pipe and the forward end engaging the hub so that the mold is concentrically positioned on the tool joint, the mold having an internal diameter larger than the external diameter of the tool joint providing a cavity of the desired configuration of the tool joint protector, and the mold having an opening therein for receiving liquid therethrough.

6 Claims, 7 Drawing Figures

DRILL PIPE TOOL JOINT PROTECTOR

BACKGROUND OF THE INVENTION

I. Field of the Invention

The invention relates to a method and apparatus for applying a protective shield to the tool joint and collars of a drill pipe.

II. Description of the Prior Art

Drill pipes utilized in drilling oil and gas wells are rapidly rotated in a bore hole in the earth's surface. In drilling a bore hole, the drill string rotates and simultaneously applies downward force to the drill bit forming the hole. The weight of the drill string, which may be thousands of feet in length, tends to cause the drill pipe to buckle or bend in the long length between the surface of the earth where the drilling rig is located and the bit penetrating deep within the earth. This bending causes the drill pipe to tend to rub on the bore hole. In addition, most bore holes depart from true vertical. In some instances, holes are drilled intentionally directionally so that from a given spot on the earth the bottom of the bore hole may be displaced laterally a considerable distance. Even when bore holes are not intentionally drilled directionally, it is exceedingly difficult to keep a bore hole in absolute vertical orientation. This departure from the vertical further causes the drill pipe to rub against the side wall of the bore hole. After a bore hole is advanced into the earth it is common procedure to line it with casing in which event at least the upper portion of the drill string is rotating within the casing. The casing provides an even smaller area for receiving the rotating drill pipe and increases the propensity of the drill pipe to rub as it is rotated inside the casing causing wear on both the drill string and the casing.

A typical length of drill pipe has a male threaded joint at one end and a female threaded joint at the other. To increase the strength of the area where the joints are made, the drill pipe is usually of increased diameter at the ends. These enlarged diameter portions of drill pipe are called "tool joints". Since they are larger in diameter than the pipe itself the tool joints usually receive the greatest amount of wear. However, in some conditions the middle of a length of drill pipe can also engage the bore hole or casing and be worn through long usages.

Others, combating the problem of the wear of drill pipe, and the particular wear at the tool joints, have provided hard surfacing of the surfaces of the tool joints. This is usually applied by electric welding of a hard material onto the outside surface of the tool joints. Tungston carbide is frequently used in such applications. Others have provided removable or detachable drill pipe protectors. These may be metal or non-metal although the use of non-metal protectors are the most common. The removable drill pipe protectors are usually bifurcated devices which are hinged at one side and are placed around the tool joint. A pin is used on the side opposite the hinge.

One difficulty with such removable type of drill pipe protectors is that of keeping them in position in the proper place on the tool joints. U.S. Pat. No. 3,942,824 shows a type of tool joint protector of a non-metallic type which includes a flange intended to keep the protector in position on an assembled tool joint. One problem with this type of device is that the finished diameter of the protector may be excessively large for the internal diameter of the casing in which the drill string is utilized thus causing drilling fluid flow restrictions.

Another type of tool joint protector is illustrated in U.S. Pat. No. 1,814,183 in which a dove-tail shaped groove is formed in a coupling which receives a mating rubber material. This type of protector requires specific machining of the tool joint and the rubber portion is difficult to replace when it becomes worn.

Most of the known type tool joint protectors require the drill string to be taken to a manufacturing plant where the protectors are applied. For instance, when a welded-on hard surface material is applied to a tool joint some means must be provided for supporting the pipe and rotating it during the application of the hard surface material.

An object of the present invention is to provide a method of installing a tool joint protector which overcomes limitations and difficulties with known types of protectors available on the market today.

A specific object of the invention is to provide a method of applying a protector to a drill string tool joint which can be easily accomplished in the field without requiring that the tool joint be rotated during the application of the protector.

SUMMARY OF THE INVENTION

A method of applying a protective shield to the tool joint of a drilling pipe is provided. The usual first step in the method is treating the tool joint to receive the protector. The protector is formed of plastic material which, in its initial state, is liquid and which subsequently solidifies to form the shield. The tool joint is prepared, such as by buffing, to remove rust, scale, dirt, oil, drilling mud and so forth. This step may be followed by spraying the tool joint with a bonding agent. Thereafter, a centering hub is positioned on the end of the tool joint. The hub has a centering portion concentric with the axis of the drill pipe. Next, a bifurcated mold is positioned around the tool joint. The mold has a rearward end engaging the tool joint and a forward end engaging the hub centering portion so that the mold is thereby centered concentrically on the drill pipe. At least a portion of the interior around the full periphery of the drill pipe of the mold is of an internal diameter larger than the external diameter of the tool joint providing an annular cavity defining the preselected shape of the protective shield. A liquid material, such as plastic resin, is injected through an opening in the mold to fill the annular cavity. This material is allowed to solidify and the mold is removed. Left on the tool joint is a plastic protector which is bonded to the surface of the tool joint. Being larger in external diameter than the tool joint, the protector absorbs wear and thereby protects the tool joint.

Also included as a part of the invention is the apparatus for applying a protective shield to a tool joint including a hub having a circular portion defining a positioning surface and a sectioned mold which is positioned around the tool joint and centered by the hub to define the cavity for forming the drill pipe protector.

DESCRIPTION OF THE VIEWS

DESCRIPTION OF THE PREFERRED EMBODIMENT

When it is desired to provide protective shields on the tool joints of drill pipe according to this invention it is, under normal conditions, first necessary that the external surface of the tool joint be prepared for receiving the protector. This is particularly true when protective shields are applied to drill pipe in field use. One of the advantages of the method of this invention is that it may be used directly in the field thereby avoiding the necessity of hauling drill pipe to a fabricating plant. On the other hand, if the protector is to be applied to new drill pipe the tool joint may already be clean without requiring the preliminary steps of first cleaning the tool joint.

Figure 1:
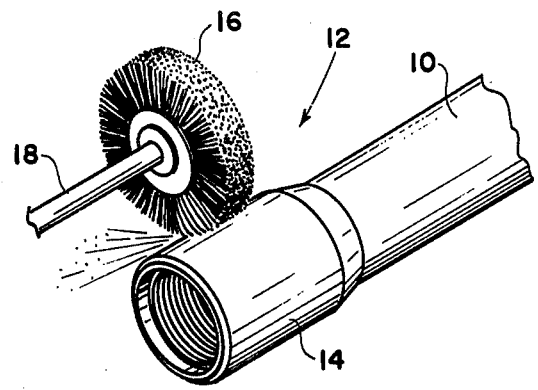
FIG. 1 is an isometric view which shows the tool joint at the end of a length of drill string being prepared for receiving a protective shield. The tool joint is being buffed to remove rust, scale, drilling mud, oil and so forth so that the surface is clean.

FIG. 1 illustrates the arrangement wherein the tool joint is first cleaned. A portion of the length of a drill pipe is generally indicated by the numeral 10. At the end of the drill pipe 10 is a tool joint, generally indicated by the numeral 12. In this case the tool joint is of female construction and in the normal arrangement the opposite end of drill pipe 10 has a tool joint of male construction. The external surface 14 must be free of contamination such as rust, scale, drilling mud, oil, water and so forth. In order to clean the surface 10 it should first be mechanically cleaned such as by the use of a buffer 16 rotated about the shaft 18 by means such as a hand-held portable drill (not shown). In addition to this simplified means of cleaning the surface 14 it can be seen that more elaborate mechanisms may be employed including the use of sandblasting. Any means of mechanically removing rust, dirt, scale and any and all other contaminants from the surface 14 would be within the scope of the invention.

Figure 2:
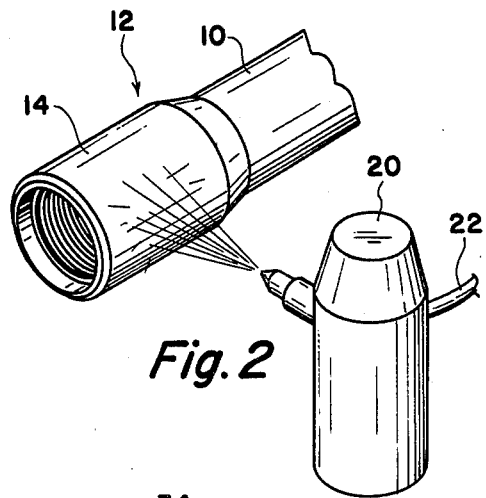
FIG. 2 is an isometric view illustrating the application of a bonding agent to the surface of the tool joint which has been cleaned by the step illustrated in FIG. 1.

The next step, as illustrated in FIG. 2, includes spraying the tool joint exterior surface 14 with a bonding agent. This may be accomplished by means of a spray gun 20 applied by air pressure through hose 22. Whether or not the application of the invention requires the use of a bonding agent depends upon the nature of the plastic material to be utilized in forming the protective shield, but in most instances it will be found that in order to permanently secure the plastic protector to the tool joint, the use of a bonding agent will be desirable.

Figure 3:
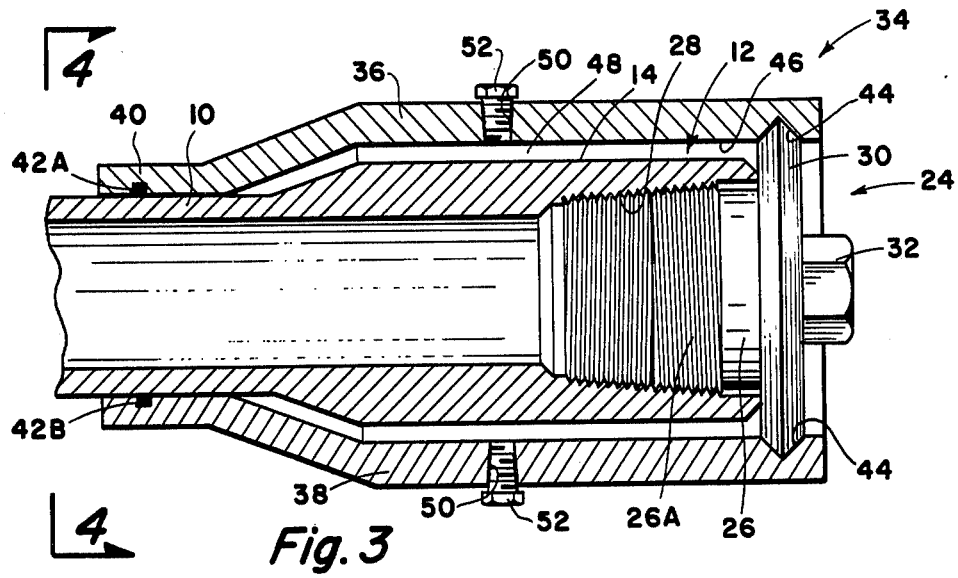
FIG. 3 is a cross-sectional view of a tool joint end of a length of drill pipe showing a female coupling, and showing, in cross-section, a bifurcated mold positioned around the tool joint preparatory for receiving an injection of liquid plastic material to form a protective shield.

The next step is illustrated in FIG. 3. A centering hub generally indicated by the numeral 24 is employed. The centering hub may either be of the type to be used with a female or with a male tool joint. FIG. 3 illustrates a female tool joint. The centering hub 24 includes an inner reduced diameter portion 26 having a threaded portion 26A which engages the internal threads 28 of the tool joint. The hub is thereby centered on the tool joint. The outer end of the hub is of an increased diameter and preferably of a diameter greater than the diameter of the tool joint exterior surface 14. The outer end 30 shown in FIG. 3 is of V-shaped configuration. An integral nut portion 32 is utilized for installing and removing hub 24.

Positioned about the tool joint and about the outer end 30 of centering hub 24, is a bifurcated mold generally indicated by the numeral 34. The mold includes a top portion 36 and a bottom portion 38. The mold is dimensioned to be positioned around the tool joint 12 so that the rearward end 40 of the mold is of internal diameter to sealably receive the external diameter of drill pipe 10. An o-ring 42A placed in a groove in top mold portion 36 and an o-ring 42B placed in a groove in the bottom mold portion serves to further insure sealable engagement of the mold to the exterior circumferential surface of drill string 10. The portion of the drill pipe 10 engaged by the mold rearward end 12 is considered a part of the drill pipe tool joint 12 for purposes of this description.

The outer end of each portion of the bifurcated mold has a V-shaped groove 44 therein so that when the mold is assembled around the centering hub 24 the mold is held in position and centered about the tool joint 12.

The internal diameter 46 of the assembled mold 34 is larger than the external diameter of the tool joint surface 14 providing an annular cavity 48 therein of dimensions defining the ultimate desired tool joint protective shield.

An opening 50 is formed in each half of the bifurcated mold although in practice only one opening is absolutely necessary. Openings 50 provide means for injecting plastic material into cavity 48. To help avoid the possibility of air being trapped, the liquid plastic may be injected into the opening 50 in bottom mold 38 until the liquid plastic has filled cavity 48 and begins to discharge through the opening 50 in the top mold portion 36. When the cavity 48 is completely filled, threaded plugs 52 are inserted into openings 50 to close the openings and further, prevent the solidification of plastic within the openings 50 which would impair removal of the mold portions after the plastic has hardened.

After the liquid plastic has been inserted and the plugs 52 positioned to close openings 50, the mold is left in position until the plastic has had sufficient time to harden. The length of time depends upon the nature of the plastic utilized and particularly the ratio of hardner utilized in the plastic composition. After the plastic has hardened the bifurcated mold is removed.

Figure 4:
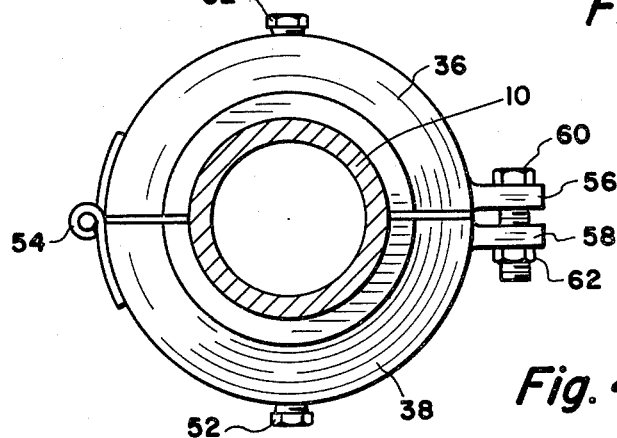
FIG. 4 is a cross-sectional view taken along the line 4—4 of FIG. 3.

FIG. 4 shows one arrangement for supporting the mold portions 36 and 38 together. A hinge 54 is attached to one edge of each of the mold portions 36 and 38. Flange 56 extending from mold portion 38 and flange 58 from mold portion 38. Flanges 56 and 58 each have an aligned opening therein which receives a bolt 60 held in place by a nut 62. It can be seen that this exemplified means of retaining the bifurcated mold in position around the tool joint may be replaced by many types of quick opening attachments well known in the art.

Figure 5:
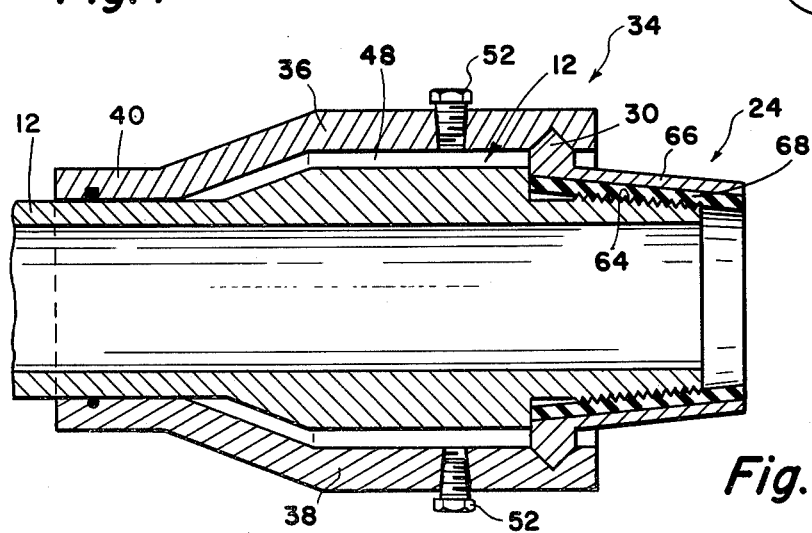
FIG. 5 is a cross-sectional view as shown in FIG. 6 but showing the hub configured for a male tool joint and showing the mold positioned on the drill pipe and hub preparatory to receiving the injection of plastic material therein.

FIG. 5 shows the arrangement in which the tool joint 12 is of a male configuration having external threads 64. In this instance the centering hub 24 has a tubular portion 66 which fits over the tool joint threads 64. It can be seen that the interior surface of the tubular portion 66 may be threaded so that the centering hub is threaded onto the male tool joint or, it may, as illustrated, include a resilient member 68 which engages threads 64. The use of resilient member 68 permits the male configured hub 24 to be inserted onto the male tool joint without threading it into position to expedite positioning it on the tool joint. Whether the centering hub 24 for the male tool joint is threaded onto or merely positioned onto the male threaded tool joint the enlarged diameter portion 30 is concentrically positioned on the tool joint and receives the bifurcated mold in the same way as described with respect to the female tool joint referenced in FIGS. 3 and 4. The upper and lower portions 36 and 38 of the bifurcated mold 34 of FIG. 5 are otherwise substantially identical and function in the same way as described with reference to FIGS. 3 and 4.

Figure 6:
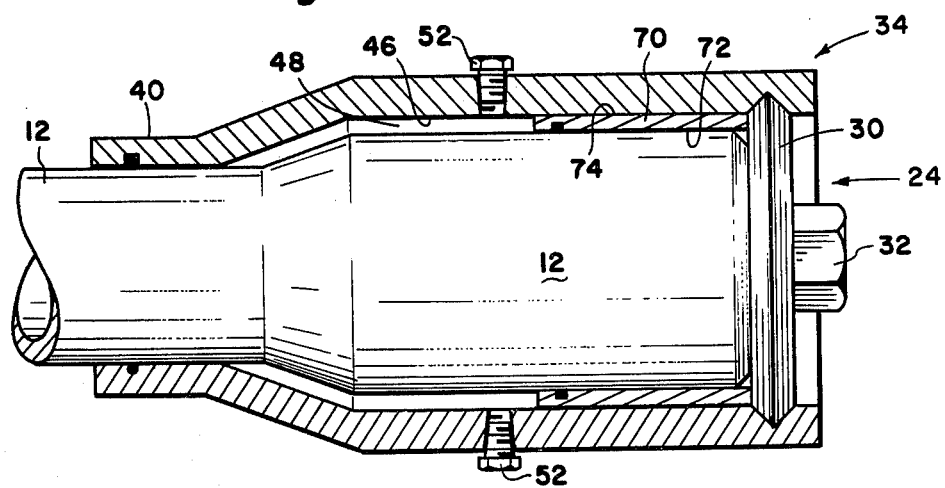
FIG. 6 is an elevational view of the end portion of a length of drill pipe showing the female tool joint as in FIG. 1 and showing the use of a spacer by which the dimensions of the protective shield may be changed.

FIG. 6 shows an alternate arrangement which employs a tubular sleeve 70 of internal diameter 72 slightly larger than the external diameter of the tool joint 12 of external diameter 74 slightly less than the internal diameter 46 of the assembled mold. The function of sleeve 70 is to reduce the volume of the cavity 48 and illustrates a means whereby the mold may be utilized with different sleeves 70 to provide protective shields having various lengths. The use of sleeve 70 is particularly useful when it is desirable to leave an exposed surface on the tool joint where torqueing tools may be applied to thread and unthread the tool joint thereby avoiding the necessity of placing the torqueing tools on the protector which obviously could damage and shorten the life of the protector.

Figure 7:
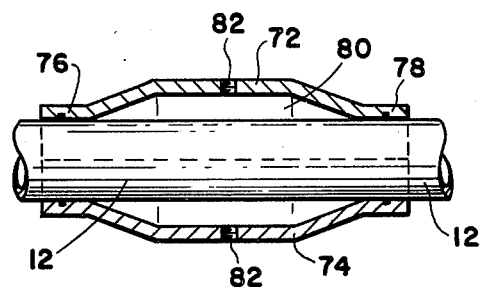
FIG. 7 is a reduced size elevational view of an intermediate length of a drill pipe and showing the configuration of a bifurcated mold, in cross-section, which may be positioned on the drill pipe so that a protective shield may be applied by the method of this invention.

FIG. 7 shows a bifurcated mold for use when a protector is to be applied to a position intermediate the tool joint ends of a length of drill pipe. The assembled mold portions 72 and 74 have a forward end 76 and rearward end 78 which sealably engage the external surface of pipe 12. In the use of the mold as illustrated in FIG. 7 no centering hub is utilized since the pipe itself is engaged by each end 76 and 78 of the assembled mold. A cavity 80 is provided by the assembled mold about the external surface of pipe 12. Plugs (not shown) are utilized to close the openings 82 in the mold for the same reasons as previously described with reference to the mold shown in FIGS. 3 and 5.

The invention has been described as it is applied to a drill string. It can be seen that the method and apparatus can be equally as well employed to apply protective shields to oil well tubing. While tubing is not normally rotated in a bore in casing, nevertheless, when tubing is run in and out of a highly deviated well, that is, one where the hole deviates to a high degree from vertical, a string of tubing is subject to much wear. The casing through which the tubing is run is also subjected to much wear as tubing is run into and out of the well. By the application of protective shields as provided herein the tubing and casing are both protected from wear. Thus the expression "drill pipe" includes any type of pipe utilized in the petroleum industry.

OPERATION

As previously indicated, except for new drill pipe or pipe which is unusually clean, the first step as exemplified in FIG. 1, is to clean the tool joint surface 14 of all foreign matter, including rust, scale, dirt, drilling mud, oil, grease, etc. The same procedure is practiced at the area in the middle of the drill string if an intermediate protector is to be applied using the sleeve type mold as shown in FIG. 7. Next, a bonding agent is applied to the surface of the tool joint or intermediate area to receive the protective shield. This may be done by spraying as illustrated in FIG. 2 or by other means such as brushing on. Some types of plastic materials may not require the preparatory application of a bonding agent.

Next a centering hub is applied to the end of the tool joint of the type shown in FIG. 3 if the tool joint is of the female construction or in FIG. 5 if the tool joint is of a male construction. The next step is the application of a segmented mold 34 at the tool joint or the sleeve type mold shown in FIG. 7 if the protector is applied to an intermediate area of the drill string. With the mold securely in place, a liquid plastic material is injected into the mold to the cavity formed by the mold. Thereafter the plastic material is allowed to solidify or harden, after which the mold and centering hub are removed. The protective sleeve is then in position to protect the drill pipe and absorb wear as the drill pipe is rotated against casing or the bore hole during drilling operations.

It can be seen that the interior surfaces of the mold 34 should be treated to prevent liquid plastic material used to form the protective sleeve from adhering to the mold. The same applies to any portions of the centering hub 24 exposed to the liquid plastic material. Compounds used to prevent plastic materials from adhering to molds are readily available on the market.

While the invention has been described with a certain degree of particularity it is manifest that many changes may be made in the details of construction and the arrangement of components without departing from the spirit and scope of this disclosure. It is understood that the invention is not limited to the embodiment set forth herein for purposes of exemplification but is to be limited only by the scope of the attached claim or claims, including the full range of equivalency to which each element thereof is entitled.

What is claimed is:

1. A method of applying a protective shield to a male tool joint of a drill pipe having tapered threads, comprising;

positioning a centering hub on the male end of the tool joint, the hub having a tubular portion engaging the tool joint external threads, and having an enlarged diameter centering portion thereof of larger diameter than the outside diameter of the tool joint providing an outer enlarged diameter circumferential centering surface;

positioning a sectioned mold around the portion of the tool joint to receive the protective shield, the mold having a rearward end engaging the tool joint and a forward end having an enlarged internal diameter circumferential recess therein which receives the hub circumferential centering surface, the mold having an opening therein, the interior diameter of the mold being greater than the exterior diameter of the tool joint in the area to receive the protective shield providing an annular cavity defining the preselected shape of the protective shield;

injecting liquid material through the opening into the mold to fill the annular cavity;

allowing the liquid material to solidify; and removing the mold and hub.

2. A method of applying a protective shield to a male tool joint of a drill pipe having tapered external threads according to claim 1 wherein said step of positioning a hub on the male end of the tool joint includes positioning a hub having a tubular portion having a tapered sleeve of resilient material therein onto the tapered threads, the resilient sleeve serving to retain the hub concentrically on the male tool joint.

3. The method of applying a protective shield to a tool joint according to claim 1 including the initial step of preparing the surface of the tool joint in the portion to receive the protective shield.

4. The method of applying a protective shield to a tool joint according to claim 3 wherein an initial step of preparing the surface of the tool joint in the portion to receive the protective shield includes mechanically cleaning the tool joint exterior surface.

5. The method of applying a protective shield to a tool joint according to claim 3 wherein an initial step of preparing the surface of the tool joint in the portion to receive the protective shield includes applying a bonding agent to the surface of the tool joint.

6. The method of applying a protective shield to a tool joint according to claim 3 wherein the initial step of preparing the surface of the tool joint in the portion to receive the protective shield includes first mechanically buffing the tool joint exterior surface followed by applying a bonding agent to the buffed surface.

* * * * *